US012639635B2

(12) United States Patent
Hummelshøj

(10) Patent No.: US 12,639,635 B2
(45) Date of Patent: May 26, 2026

(54) SYSTEMS AND METHODS WITH MACHINE LEARNED DATASET EMBEDDING FOR DATA FUSION OF MATERIAL PROPERTY DATASETS

(71) Applicant: Toyota Research Institute, Inc., Los Altos, CA (US)

(72) Inventor: Jens Strabo Hummelshøj, Brisbane, CA (US)

(73) Assignee: Toyota Research Institute, Inc., Los Altos, CA (US)

( * ) Notice: Subject to any disclaimer, the term of this patent is extended or adjusted under 35 U.S.C. 154(b) by 1160 days.

(21) Appl. No.: 17/582,515

(22) Filed: Jan. 24, 2022

(65) Prior Publication Data

US 2023/0245003 A1    Aug. 3, 2023

(51) Int. Cl.
| | |
|---|---|
| *G06N 20/10* | (2019.01) |
| *G06F 18/214* | (2023.01) |
| *G06N 3/08* | (2023.01) |
| *G06N 7/01* | (2023.01) |
| *G06N 20/00* | (2019.01) |

(52) U.S. Cl.
CPC ........... *G06N 20/10* (2019.01); *G06F 18/214* (2023.01); *G06N 3/08* (2013.01); *G06N 7/01* (2023.01); *G06N 20/00* (2019.01)

(58) Field of Classification Search
CPC ........ G06N 20/00; G06N 20/10; G06N 20/20; G06N 3/08; G06N 3/094; G06N 3/0985; G06N 7/01; G06F 18/214
See application file for complete search history.

(56) References Cited

U.S. PATENT DOCUMENTS

2020/0051235 A1*   2/2020   Majumdar ........... G01N 21/211
2021/0133635 A1*   5/2021   Hagawa ................... G06N 3/08
(Continued)

OTHER PUBLICATIONS

Gopakumar et al., Multi-objective Optimization for Materials Discovery via Adaptive Design, Feb. 27, 2018, Nature: Scientific Reports, pp. 1-12. (Year: 2018).*
(Continued)

*Primary Examiner* — Shane D Woolwine
(74) *Attorney, Agent, or Firm* — Christopher G. Darrow; Darrow Mustafa PC

(57) ABSTRACT

A machine learning system includes a processor and a memory communicably coupled to the processor. The memory stores machine-readable instructions that, when executed by the processor, cause the processor to select a training dataset comprising training material compositions and tagged material property values, select at least two material property datasets comprising material compositions with corresponding material property values, and embed the training material compositions and the material compositions of the at least two material property datasets into a chemical space of a machine learning module. The memory also stores machine-readable instructions that, when executed by the processor, cause the processor to predict, based at least in part on the training material compositions and the material compositions of the at least two material property datasets embedded in the chemical space, property values for corresponding material compositions in the at least two material property datasets.

20 Claims, 5 Drawing Sheets

(56)         References Cited

U.S. PATENT DOCUMENTS

2021/0334655 A1 * 10/2021 Obika ..................... G06N 3/08
2025/0044783 A1 * 2/2025 Gao .................. G05B 23/0281

OTHER PUBLICATIONS

Schütt et al., "A deep learning architecture for molecules and materials," The Journal of Chemical Physics, vol. 148, Issue 24, Mar. 22, 2018, pp. 1-11.
Goodall et al., "Predicting materials properties without crystal structure: deep representation learning from stoichiometry," Nature Communications vol. 11, Article No. 6280, 2020, pp. 1-9.
Venkatram et al., "Predicting Crystallization Tendency of Polymers Using Multifidelity Information Fusion and Machine Learning," J. Phys. Chem. B 2020, 124, 28, pp. 6046-6054.
Yamada et al., "Predicting Materials Properties with Little Data Using Shotgun Transfer Learning," ACS Cent. Sci. 2019, 5, pp. 1717-1730.
Feng et al., "A general and transferable deep learning framework for predicting phase formation in materials," npj Computational Materials, vol. 7, Article No. 10, 2021, pp. 1-10.
Jha et al., "Enabling deeper learning on big data for materials informatics applications," Scientific Reports vol. 11, Article No. 4244, 2021, pp. 1-12.

* cited by examiner

| Composition | Property A Dataset 1 | Property A Dataset 2 |
|---|---|---|
| $A_{x1}B_{y1}C_{z1}$ | 0.81 | 1.13 |
| $A_{x2}B_{y1}C_{z2}$ | 0.95 | 1.00 |
| $A_{x1}B_{y2}C_{z1}$ | 1.12 | 1.35 |
| ⋮ | ⋮ | ⋮ |
| $A_{x1}B_{y1}C_{z1}D_{q1}$ | 1.09 | 1.73 |
| $A_{x2}B_{y1}C_{z2}D_{q1}$ | 1.23 | 1.04 |
| $A_{x1}B_{y2}C_{z1}D_{q1}$ | 1.47 | 1.61 |
| ⋮ | ⋮ | ⋮ |

FIG. 1

SYSTEMS AND METHODS WITH MACHINE LEARNED DATASET EMBEDDING FOR DATA FUSION OF MATERIAL PROPERTY DATASETS

TECHNICAL FIELD

The present disclosure relates generally to machine learning of material properties and particularly to machine learning of material properties using embedded material property datasets.

BACKGROUND

The discovery of new materials and/or unknown properties of existing materials is desirable for continued technological developments in industries such as automotive, aerospace, energy production, chemical processing, and semiconductor manufacturing, among others. Also, the desire for such discoveries has fueled first-principle computational research in an effort to reduce the time and cost associated with materials development. And while first-principle computational research has led to the development of new alloys and semiconductors, computation time needed for first-principle calculations can be longer than desired and/or not practical.

The present disclosure addresses issues related to machine learning to predict material properties, and other issues related to predicting material properties.

SUMMARY

This section provides a general summary of the disclosure, and is not a comprehensive disclosure of its full scope or all of its features.

In one form of the present disclosure, a system includes a processor and a memory communicably coupled to the processor. The memory stores machine-readable instructions that, when executed by the processor, cause the processor to select a training dataset comprising training material compositions and tagged material property values, select at least two material property datasets comprising material compositions with corresponding material property values, embed the training material compositions and the material compositions of the at least two material property datasets into a chemical space of a machine learning module, and predict, based at least in part on the training material compositions and the material compositions of the at least two material property datasets embedded in the chemical space, property values for corresponding material compositions in the at least two material property datasets.

In another form of the present disclosure, a system includes a processor and a memory communicably coupled to the processor, and the memory stores an acquisition module including instructions that when executed by the processor cause the processor to select a training dataset comprising training material compositions, and select at least two material property datasets from a material properties dataset, the at least two material property datasets including material compositions with tagged material property values for a predefined material property. The memory also stores a machine learning module including instructions that when executed by the processor cause the processor during each of one or more iterations, to embed the training material compositions and the material compositions of the at least two material property datasets into a chemical space of the machine learning module, train a machine learning model to learn representations of the training material compositions and the material compositions of the at least two material property embedded in the chemical space, predict, based at least in part on the training material compositions and the material compositions of the at least two material property datasets embedded in the chemical space, property values for the material compositions of the at least two material property datasets, and predict, based at least in part on the predicted property values for the material compositions of the at least two material property datasets, a systematic error in the material property values in one of the at least two material property datasets.

In still another form of the present disclosure, a method includes selecting a training dataset comprising training material compositions, selecting at least two material property datasets comprising material compositions with corresponding material property values, embedding the training material compositions and the material compositions of the at least two material property datasets into a chemical space of a machine learning module, and predicting, based at least in part on the training material compositions and the material compositions of the at least two material property datasets embedded in the chemical space, a single property value for the material compositions of the at least two material property datasets.

Further areas of applicability and various methods of enhancing the above technology will become apparent from the description provided herein. The description and specific examples in this summary are intended for purposes of illustration only and are not intended to limit the scope of the present disclosure.

BRIEF DESCRIPTION OF THE DRAWINGS

The present teachings will become more fully understood from the detailed description and the accompanying drawings, wherein:

FIG. 1 shows a table with a listing of a plurality of material compositions and corresponding material property values from two different material property datasets;

DETAILED DESCRIPTION

Figure 2:
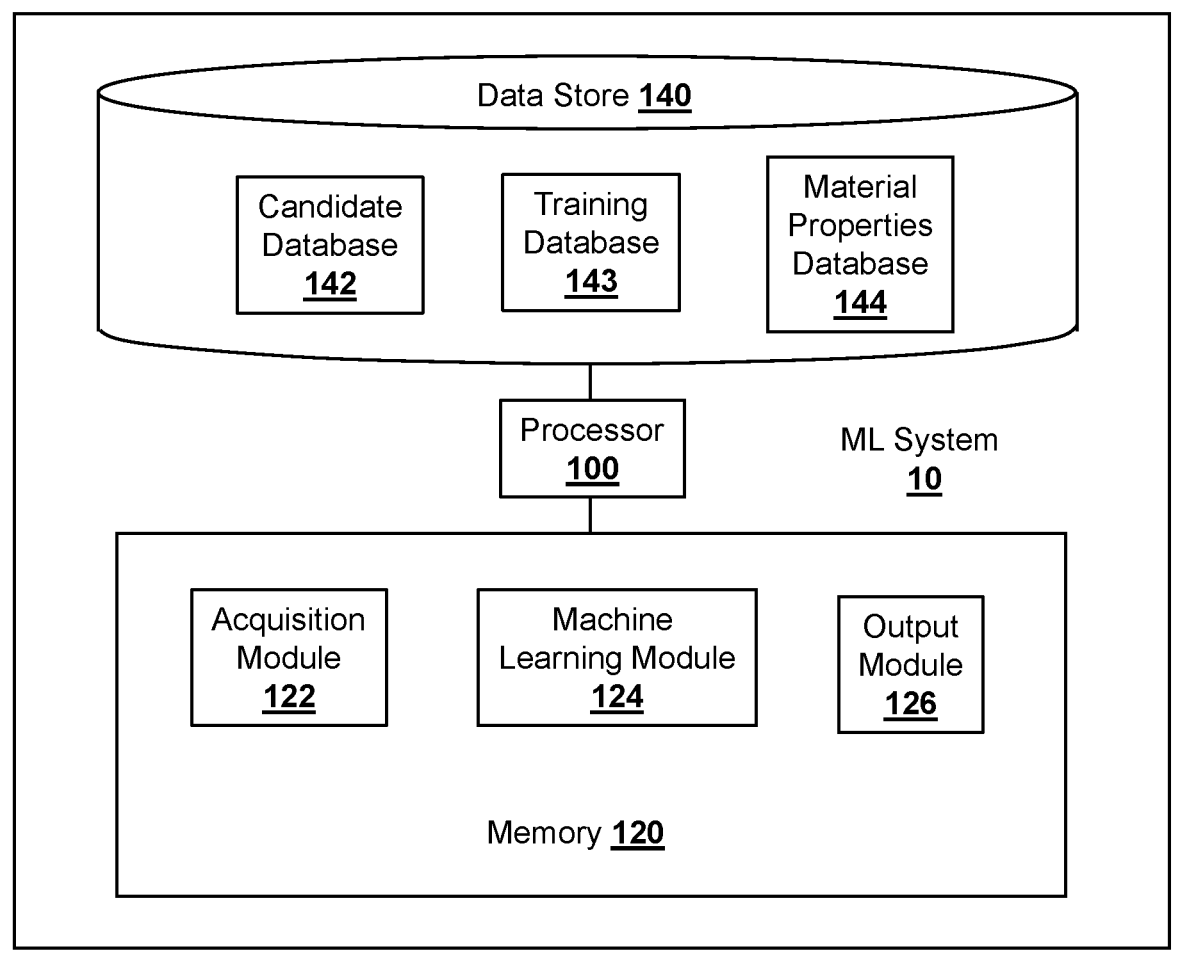
FIG. 2 illustrates an example of a machine learning system for predicting material properties according to the teachings of the present disclosure.

The present disclosure provides a machine learning (ML) system and a ML method for predicting a material property value for a plurality of material compositions by training a ML model to learn representations of training material compositions and material compositions from at least two different material property datasets embedded in a chemical space of the ML system. And in some variations of the present disclosure, the ML system and ML method predict a systematic error or variance of the at least two material property datasets such that the datasets are fused together within the ML model. As used herein, terms such as "property" and phrases such as "material property", "the prop-
erty", and "predicting the property" refer to a property
exhibited by a material (e.g., electronic bandgap; also
referred to herein simply as "bandgap") and a value for the
property. And as used herein the phrase "material compo-
sition" refers compositions of multicomponent materials and
elements in the periodic table, and term terms "fuse" or
fusing" and the phrase "fused together" refers to two or more
material properties datasets for a predefined material prop-
erty embedded within a chemical space of a ML model that
are employed or used as a single dataset within a ML model.

Referring to FIG. 1, a table illustrating two material
property datasets for a single material property (Property A)
and a plurality of material compositions is shown. The table
has a column of hypothetical material compositions, a
column of corresponding material property values for a
hypothetical Property A of the material compositions from a
first dataset (Dataset 1), and another column of correspond-
ing material property values for the hypothetical Property A
from a second dataset (Dataset 2). Such tables, i.e., collec-
tions of material property data for a predefined material
property with data from different datasets, are typically
tabulated from material property data obtained from sources
such as reference books, peered reviewed articles, national
laboratories, universities, international initiatives, and tech-
nical societies, among others.

Still referring to FIG. 1, variations in material property
values for a given material composition can be, and typically
are, present between material property datasets provided
from different sources as shown by comparing the values for
Property A, Dataset 1 and the values for Property A. Dataset
2. Stated differently, a single material composition has two
different values for the same material property. In some
variations, material property datasets include simulated
material property values (i.e., a simulated material property
dataset), such as values simulated using first principle simu-
lations (calculations) and/or material property values simu-
lated via machine learning. In the alternative, or in addition
to, material property datasets include experimentally deter-
mined material property values (i.e., an experimental mate-
rial property dataset). And while both types of material
property datasets can be useful, each type of dataset can
include systematic errors due to assumptions made for and
during simulations and/or use of specific experimental tech-
niques and/or equipment. Accordingly, such variations in
material property datasets show a need or desire to use such
datasets, in combination, for prediction of material property
values, and to know and understand any systematic error or
variance within a given material property dataset.

Referring now to FIG. 2, a ML system 10 for fusing two
or more material property datasets for a predefined material
property as discussed above with respect to FIG. 1 is
illustrated. The ML system 10 is shown including one or
more processors 100 (referred to herein simply as "processor
100"), a memory 120 and a data store 140 communicably
coupled to the processor 100. It should be understood that
the processor 100 can be part of the ML system 10, or in the
alternative, the ML system 10 can access the processor 100
through a data bus or another communication path.

The memory 120 is configured to store an acquisition
module 122, a ML module 124, and in some variations, an
output module 126. The memory 120 is a random-access
memory (RAM), read-only memory (ROM), a hard-disk
drive, a flash memory, or other suitable memory for storing
the acquisition module 122, the ML module 124, and the
output module 126. Also, the acquisition module 122, ML
module 124 and output module 126 are, for example, computer-readable instructions that when executed by the
processor 100 cause the processor(s) to perform the various
functions disclosed herein.

In some variations the data store 140 is a database, e.g.,
an electronic data structure stored in the memory 120 or
another data store. Also, in at least one variation the data
store 140 in the form of a database is configured with
routines that can be executed by the processor 100 for
analyzing stored data, providing stored data, organizing
stored data, and the like. Accordingly, in some variations the
data store 140 stores data used by one or more of the
acquisition module 122, ML module 124 and output module
126. For example, and as shown in FIG. 2, in at least one
variation the data store 140 stores a candidate database 142,
a training database 143, and a material properties database
144. In some variations the candidate database 142 includes
a listing of a plurality of material compositions, including a
listing of chemical elements, the training database 143
includes training data, sometimes referred to as "ground-
truth data" in the form of training material compositions and
known material property values for corresponding training
material compositions, and the material properties database
144 includes material compositions with material property
values, simulated and/or experimentally determined, from
different material property datasets.

In some variations, the material property values in the
material properties database 144 are properly tagged and/or
associated with the plurality of material compositions in the
candidate database 142. In the alternative, or in addition to,
in at least one variation the material properties database 144
includes material property values for a plurality of material
compositions that overlap with at least a portion of the
material compositions in the candidate database 142 and/or
the training database 143. And in another alternative, or in
addition to, the material properties database 144 includes
material property values for a plurality of material compo-
sitions that are of the same material class as at least a portion
of the material compositions in the candidate database 142
and/or the training database 143. Non-limiting examples of
material classes and material compositions corresponding to
the material classes include elements listed in the periodic
table of elements, alloy materials, semiconductor materials,
dielectric materials, thermoelectric materials, and supercon-
ducting materials, catalyst materials, absorbent materials,
and battery materials, among others.

Material properties in the material properties database 144
include any material property that is known or predicted via
simulation and/or experimentation. In addition, the material
properties database 144 includes two or more material
property datasets with material properties of a given or
predefined material property. Stated differently, the material
properties database 144 includes at least two datasets with
values of the same material property for a plurality of
material compositions. Non-limiting examples of the pre-
defined material property include formation energy, elec-
tronic bandgap, electrical conductivity, thermal conductiv-
ity, acoustical absorption, acoustoelastic effect, surface
energy, surface tension, capacitance, dielectric constant,
dielectric strength, thermoelectric effect, permittivity, piezo-
electricity, pyroelectricity, Seebeck coefficient, curie tem-
perature, diamagnetism, hall coefficient, magnetic hyster-
esis, electrical hysteresis, magnetoresistance, maximum
energy product, permeability, piezomagnetism, Young's
modulus, viscosity, Poisson's ratio and density, among oth-
ers.

The acquisition module 122 can include instructions that
function to control the processor 100 to select a plurality of training material compositions from the training database 143 and a plurality of material compositions from at least two material property datasets 144$_i$ from the material properties database 144 and for at least one predefined material property. In some variations, the acquisition module 122 includes instructions that function to control the processor 100 to select the plurality of training material compositions from the training database 143 and the at least two material property datasets from the material properties database 144 such that at least a portion of the material compositions in the at least two material property datasets have the same composition with at least a portion of the material compositions of the training database 143. In the alternative, or in addition to, the acquisition module 122 includes instructions that function to control the processor 100 to select the plurality of material compositions from the training database 143 and the at least two material property datasets from the material properties database 144 such that at least a portion of the material compositions in the at least two material property datasets are in the same material class as at least of portion of the material compositions of the training dataset, with or without the same material composition.

Figure 3:
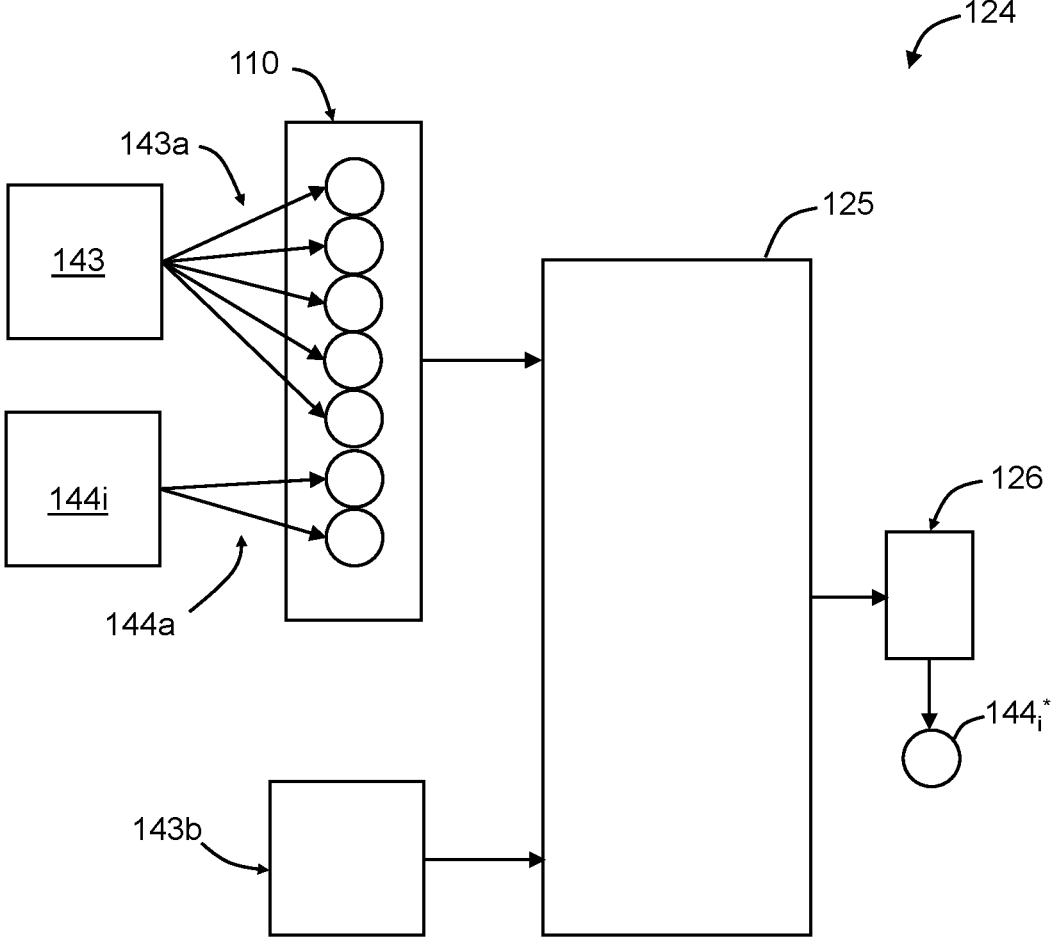
FIG. 3 illustrates a portion of the machine learning system in FIG. 2.

The ML module 124 includes instructions that function to control the processor 100 to embed the training material compositions from training database 143 and the material compositions from the selected at least two material property datasets into a chemical space (also known as a "feature space") of the machine learning module 124. For example, and with reference to FIG. 3, material compositions 143$a$ from the training database 143 and material compositions 144$a$ from at least two material property datasets 144$_i$ selected by the acquisition module 122 are embedded in a chemical space 110. As used herein, the term "embed" or "embedding" refers to a learned representation of a material composition, while preserving essential information of the material composition and/or the material composition with the corresponding material property value. Non-limiting examples of embedding or embedding techniques include encoders, distance matrix, principal component analysis (PCA), kernel PCA, multidimensional scaling (MDS), locally linear embedding, modified locally linear embedding, and t-distributed stochastic neighbor embedding (t-SNE), among others.

The ML module 124 includes instructions that function to control the processor 100 to train a ML model 125 to learn a representation (e.g., a feature vector) for each of the material compositions 143$a$ in the training database 143 and each of the material compositions 144$a$ from the at least two material property datasets 144$_i$ using corresponding material property values 143$b$ for the material compositions 143$a$ from the training database 143. And by learning representations of each of the material compositions 143$a$ from the training database 143 and each of the material compositions 144$a$ from the at least two material property datasets 144$_i$ embedded in the same chemical space 110, the ML system 10 fuses the at least two material property datasets 144$_i$ together in the ML module 124. That is, traditional ML systems learn representations of a training dataset without incorporation and learning representations of data from two additional datasets, much less two different datasets having different material property values for material compositions within the two additional datasets, and thus fail to take advantage of learning representations for material compositions from additional datasets during training of ML models.

In some variations, the ML module 124 trains the ML model 125 with known experimentally determined material property values, i.e., the training material compositions in the training database 143 are tagged with experimentally determined material property values. In other variations, the ML module 124 trains the ML model 125 with material property values obtained via first principles calculations, i.e., the training material compositions in the training database 143 are tagged with first principles calculated material property values. And in at least one variation, the ML module 124 trains the ML model 125 with known experimentally determined material property values and material property values obtained via first principles calculations i.e., at least a portion of the training material compositions in the training database 143 are tagged experimentally determined material property values and at least a portion of the training material compositions are tagged with first principles calculated material property values. As used herein the phrase "first principles calculation" refers to calculations of material physical property values directly from basic physical quantities such as the mass and charge, Coulomb force of an electron, among others, based on the principle of quantum mechanics.

In some variations, training of the ML model 125 provides for predicting, based at least in part on the material compositions 144$a$ embedded in the chemical space 110, material property values for a plurality of material compositions in the candidate database 142 with less error than prediction of material property values for the plurality of material compositions in the candidate database 142 without the material compositions 144$a$ embedded in the chemical space 110. And in at least one variation, training of the ML model 125 provides a systematic error of the material property values in the one or more of the at least two material property datasets 144$_i$ selected from the material properties database 144.

For example, in some variations, and after training of the ML model 125, the ML system 10 computes a material property value for each of the material compositions 144$a$ in the at least two material property datasets 144$_i$ and compares the computed material property values with the tagged material property values for the material compositions 144$a$. And such a comparison provides a systematic error in the tagged material property values, which in turn allows for one or more adjusted material property datasets to be generated. It should be understood that material property datasets can contain or include thousands, and sometimes hundreds of thousands of material compositions with corresponding material property values and determining a systematic error in such material property datasets enhances the accuracy and/or usefulness of the material property datasets.

In some variations, an output module 126 provides or generates an adjusted material property dataset(s) 144$_i$* (FIG. 3) that is based at least in part on the tagged material property values of the at least two material property datasets 144$_i$ minus the systematic error discussed above. In addition, the adjusted material property dataset(s) 144$_i$* can be used as training input data for the ML model 125 and/or training input data in another ML module (not shown). In some variations, the adjusted material property dataset(s) 144$_i$* is embedded and replaces at least one of the embedded material property datasets 144$_i$ in the chemical space 110, while in other variations the adjusted material property dataset(s) 144$_i$* is embedded in addition to the embedded material property datasets 144$_i$ in the chemical space 110.

Non-limiting examples of the ML model include ML models such as nearest neighbor models, Naïve Bayes models, linear regression models, support vector machine (SVM) models, and neural network models, among others.

And in at least one variation the ML model is a Gaussian Process regression model. Also, training of the ML model provides a model that predicts of an optimized material composition with respect to a predefined material property to within a desired value (i.e., less than or equal to a desired value) of a cost function (also known as a loss function).

Figure 4:
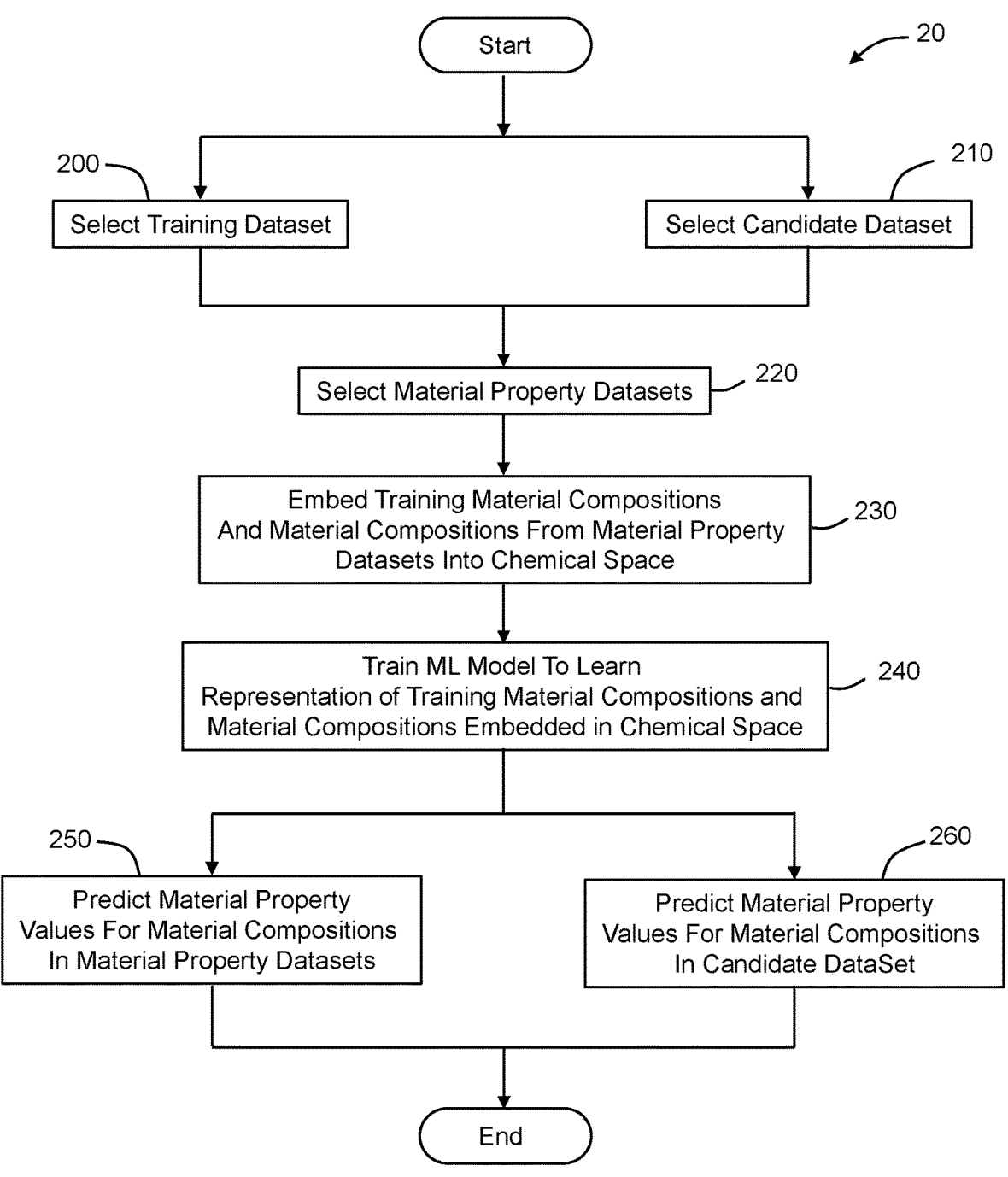
FIG. 4 shows a flow chart for a machine learning method using the system illustrated in FIG. 2 to predict material property values according to the teachings of the present disclosure.

Referring now to FIG. 4, a flow chart for a ML method 20 is shown. The ML method 20 includes selecting a training data set at 200 and selecting at least two material property datasets at 220. In some variations, the ML method 20 includes selecting a candidate dataset at 210. The ML method 20 embeds training material compositions from the training dataset and material compositions from the at least two material property datasets into a chemical space of a ML module at 230 and trains a ML model to learn a representation of the embedded training material compositions and material compositions from the at least two material property datasets using the corresponding material property values for the training material compositions at 240. In some variations, the ML method 20 predicts, based at least in part on embedded material compositions from the at least two material property datasets, a material property value for each of the material compositions in the at least two material property datasets at 250. In the alternative, or in addition to, the ML method 20 predicts, based at least in part on embedded material compositions from the at least two material property datasets, a material property value for material compositions in the candidate dataset at 260.

Figure 5:
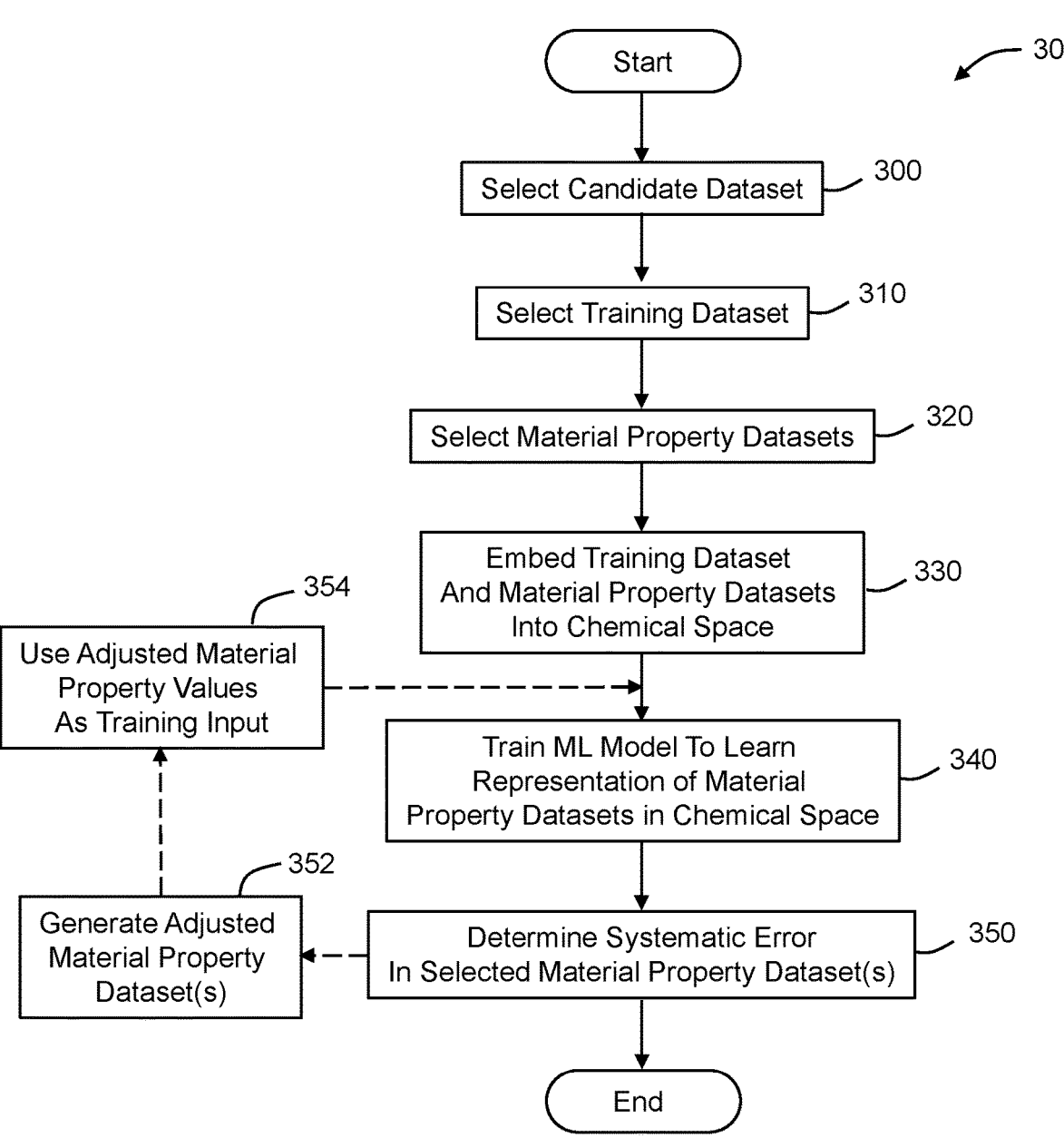
FIG. 5 shows a flow chart for another machine learning method using the system illustrated in FIG. 4 to predict material property values according to the teachings of the present disclosure.

Referring now to FIG. 5, a flow chart for another ML method 30 is shown. The ML method 30 includes selecting a candidate dataset at 300, selecting a training dataset at 310, and selecting at least two material property datasets at 320. After selecting the training data set at 310 and the at least two material property datasets at 320, the ML method 30 embeds training material compositions from the training dataset and material compositions from the at least two material property datasets into a chemical space of a ML module at 330, trains a ML model to learn a representation of each of the embedded training material compositions and material compositions from the at least two material property datasets at 340, and determines a systematic error in at least one of the at least two material property datasets at 350. Optionally, the ML method 30 generates at least one adjusted material property dataset at 352. In some variations, the ML method 30 uses adjusted material property values from the at least one adjusted material property dataset as additional training input data for the ML model at 354. And in at least one variation, the ML method 30 provides the at least one adjusted material property dataset for use with another ML module and/or other calculations (not shown).

The preceding description is merely illustrative in nature and is in no way intended to limit the disclosure, its application, or uses. Work of the presently named inventors, to the extent it may be described in the background section, as well as aspects of the description that may not otherwise qualify as prior art at the time of filing, are neither expressly nor impliedly admitted as prior art against the present technology.

As used herein, the phrase at least one of A, B, and C should be construed to mean a logical (A or B or C), using a non-exclusive logical "or." It should be understood that the various steps within a method may be executed in different order without altering the principles of the present disclosure. Disclosure of ranges includes disclosure of all ranges and subdivided ranges within the entire range.

The headings (such as "Background" and "Summary") and sub-headings used herein are intended only for general organization of topics within the present disclosure, and are not intended to limit the disclosure of the technology or any aspect thereof. The recitation of multiple variations or forms having stated features is not intended to exclude other variations or forms having additional features, or other variations or forms incorporating different combinations of the stated features.

As used herein the term "about" when related to numerical values herein refers to known commercial and/or experimental measurement variations or tolerances for the referenced quantity. In some variations, such known commercial and/or experimental measurement tolerances are +/−10% of the measured value, while in other variations such known commercial and/or experimental measurement tolerances are +/−5% of the measured value, while in still other variations such known commercial and/or experimental measurement tolerances are +/−2.5% of the measured value. And in at least one variation, such known commercial and/or experimental measurement tolerances are +/−1% of the measured value.

The flowcharts and block diagrams in the figures illustrate the architecture, functionality, and operation of possible implementations of systems, methods, and computer program products according to various embodiments. In this regard, a block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a ROM, an EPROM or flash memory, a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, modules as used herein include routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an ASIC, a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, radio frequency (RF), etc., or any suitable combination of the foregoing. Computer program code for carrying out operations for aspects of the present arrangements may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

As used herein, the terms "comprise" and "include" and their variants are intended to be non-limiting, such that recitation of items in succession or a list is not to the exclusion of other like items that may also be useful in the devices and methods of this technology. Similarly, the terms "can" and "may" and their variants are intended to be non-limiting, such that recitation that a form or variation can or may comprise certain elements or features does not exclude other forms or variations of the present technology that do not contain those elements or features.

The broad teachings of the present disclosure can be implemented in a variety of forms. Therefore, while this disclosure includes particular examples, the true scope of the disclosure should not be so limited since other modifications will become apparent to the skilled practitioner upon a study of the specification and the following claims. Reference herein to one variation, or various variations means that a particular feature, structure, or characteristic described in connection with a form or variation or particular system is included in at least one variation or form. The appearances of the phrase "in one variation" (or variations thereof) are not necessarily referring to the same variation or form. It should be also understood that the various method steps discussed herein do not have to be carried out in the same order as depicted, and not each method step is required in each variation or form.

The foregoing description of the forms and variations has been provided for purposes of illustration and description. It is not intended to be exhaustive or to limit the disclosure. Individual elements or features of a particular form or variation are generally not limited to that particular form or variation, but, where applicable, are interchangeable and can be used in a selected form or variation, even if not specifically shown or described. The same may also be varied in many ways. Such variations should not be regarded as a departure from the disclosure, and all such modifications are intended to be included within the scope of the disclosure.

What is claimed is:

1. A system comprising:
   a processor; and
   a memory communicably coupled to the processor and storing machine-readable instructions that, when executed by the processor, cause the processor to:
      select a training dataset comprising training material compositions and tagged material property values;
      select at least two material property datasets containing the same material property and comprising material compositions with corresponding material property values;
      train a machine learning model by embedding both the training material compositions and the material compositions of the selected at least two material property datasets into a chemical space of a machine learning module; and
      predict, based at least in part on the training material compositions and the material compositions of the selected at least two material property datasets embedded in the chemical space and the same material property in the at least two material property datasets, material property values for corresponding material compositions in the selected at least two material property datasets.

2. The system according to claim 1, wherein one of the selected at least two material property datasets is a simulated material property dataset with simulated material property values for the material compositions.

3. The system according to claim 2, wherein the simulated material property values are first principle simulated material property values.

4. The system according to claim 2, wherein the simulated material property values are machine learning simulated material property values.

5. The system according to claim 1, wherein one of the selected at least two material property datasets is an experimental material property dataset with experimentally determined material property values for the material compositions.

6. The system according to claim 1, wherein one of the selected at least two material property datasets is a simulated material property dataset with simulated material property values for the material compositions and another of the selected at least two material property datasets is an experimental material property dataset with experimentally determined material property values for the material compositions.

7. The system according to claim 1, wherein the machine learning module includes instructions that when executed by the processor cause the processor during each of one or more iterations to predict, based at least in part on the material compositions of the selected at least two material property datasets embedded in the chemical space, a systematic error in the material property values in one of the selected at least two material property datasets.

8. The system according to claim 7, wherein the machine learning module includes instructions that when executed by the processor cause the processor during each of one or more iterations to adjust, based at least in part on the systematic error in the material property values, the material property values in the one of the selected at least two material property datasets and generate an adjusted material property dataset for the one of the selected at least two material property datasets.

9. The system according to claim 8, wherein the machine learning module includes instructions that when executed by the processor cause the processor to use the adjusted material property dataset as training input data for a machine learning model.

10. The system according to claim 8 further comprising an output module including instructions that when executed by the processor cause the processor to provide the adjusted material property dataset to a chemical space of another machine learning module.

11. The system according to claim 1, wherein the machine learning module includes instructions that when executed by the processor cause the processor during each of one or more iterations to predict, based at least in part on the training material compositions and the material compositions of the selected at least two material property datasets embedded in the chemical space, a systematic error in the material property values in each of the selected at least two material property datasets.

12. The system according to claim 11, wherein the machine learning module includes instructions that when executed by the processor cause the processor during each of one or more iterations to adjust, based at least in part on the systematic error in the material property values, the material property values in each of the selected at least two material property datasets and generate an adjusted material property dataset for each of the selected at least two material property datasets.

13. The system according to claim 12, wherein the machine learning module includes instructions that when executed by the processor cause the processor to use the adjusted material property datasets as training input data for a machine learning model.

14. The system according to claim 1, wherein the memory communicably coupled to the processor and storing the machine-readable instructions cause the processor to train a machine learning model using the training material compositions and the material compositions of the selected at least two material property datasets embedded in the chemical space as input data.

15. The system according to claim 14, wherein the machine learning model is selected from the group consisting of a nearest neighbor model, a Naïve Bayes model, a linear regression model, a support vector machine (SVM) models, a Gaussian Process regression model, and a neural network model.

16. A system comprising:
a processor; and
a memory communicably coupled to the processor, the memory storing:
    an acquisition module including instructions that when executed by the processor cause the processor to:

select a training dataset comprising training material compositions; and
      select at least two material property datasets containing the same material property from a material properties dataset, the selected at least two material property datasets including material compositions with tagged material property values for a predefined material property;
    a machine learning module including instructions that when executed by the processor cause the processor during each of one or more iterations, to:
      embed both the training material compositions and the material compositions of the selected at least two material property datasets into a chemical space of the machine learning module;
      train a machine learning model to learn representations of the training material compositions and the material compositions of the selected at least two material property datasets embedded in the chemical space;
      predict, based at least in part on the training material compositions and the material compositions of the selected at least two material property datasets embedded in the chemical space, material property values for the material compositions of the selected at least two material property datasets; and
      predict, based at least in part on the material property values for the material compositions of the selected at least two material property datasets, a systematic error in the material property values in one of the selected at least two material property datasets.

17. The system according to claim 16, wherein the selected at least two material property datasets are selected from the group consisting of a simulated material property dataset with simulated material property values for the material compositions, an experimental material property dataset with experimentally determined material property values for the material compositions, and combinations thereof.

18. The system according to claim 16, wherein the machine learning module includes instructions that when executed by the processor cause the processor during each of one or more iterations to predict, based at least in part on the material property values for the material compositions of the selected at least two material property datasets, a systematic error in the material property values in each of the selected at least two material property datasets.

19. A method comprising:
selecting a training dataset comprising training material compositions;
selecting at least two material property datasets containing the same material property and comprising material compositions with tagged material property values;
embedding both the training material compositions and the material compositions of the selected at least two material property datasets into a chemical space of a machine learning module; and
predicting, based at least in part on the training material compositions and the material compositions of the selected at least two material property datasets embedded in the chemical space, material property values for the material compositions of the selected at least two material property datasets.

20. The method according to claim 19 further comprising:

predicting a systematic error in the material property values for the material compositions of the selected at least two material property datasets; and generating, based at least in part on the systematic error in the material property values, an adjusted material property dataset for each of the selected at least two material property datasets.

\*    \*    \*    \*    \*